March 28, 1961 R. R. BOCKEMUEHL 2,977,499
ELECTRONIC DRIFT COMPENSATOR
Filed Oct. 2, 1958
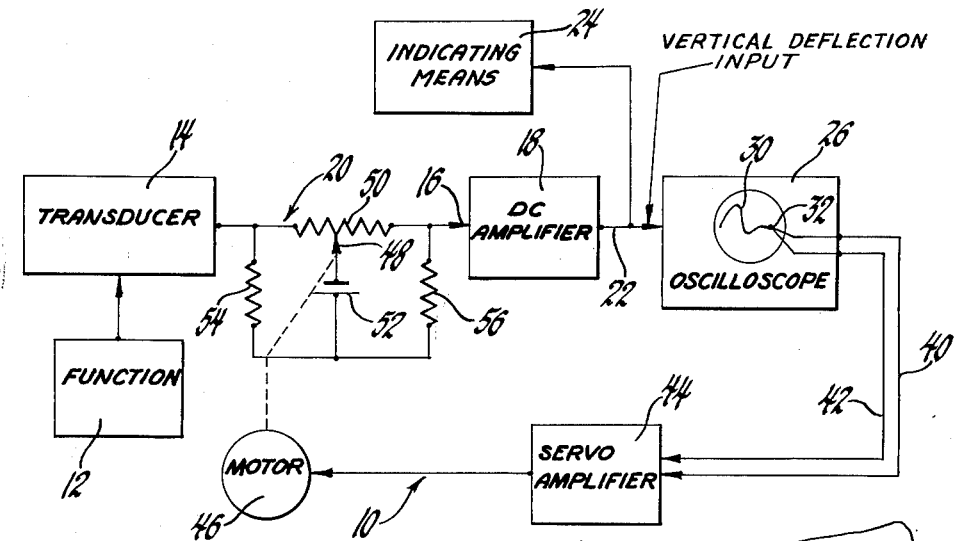
Fig. 1
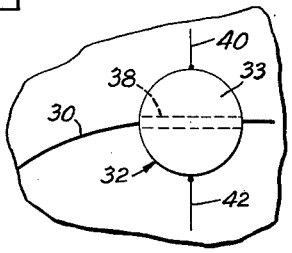
Fig. 4
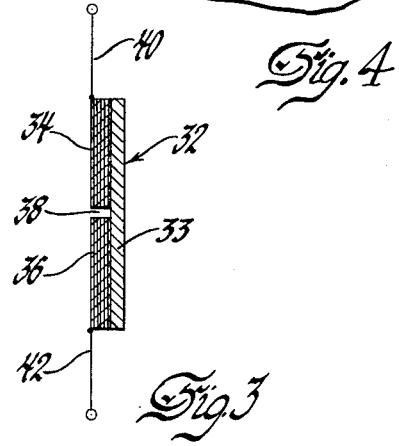
Fig. 2
Fig. 3
INVENTOR.
Robert R. Bockemuehl
BY
J. R. Sadler
ATTORNEY

United States Patent Office
2,977,499
Patented Mar. 28, 1961

2,977,499
ELECTRONIC DRIFT COMPENSATOR

Robert R. Bockemuehl, Birmingham, Mich., assignor to General Motors Corporation, Detroit, Mich., a corporation of Delaware Filed Oct. 2, 1958, Ser. No. 764,824

10 Claims. (Cl. 315—9)

The present invention relates to means for measuring cyclic events which occur at a very slow rate or have a long period and, more particularly, it relates to means for electrically "clamping" a low frequency measuring system to insure a fixed reference level from which the signal is measured.

It is very frequently desirable to employ electronic means for measuring cyclic events that occur at a very slow rate or low frequency. For example, it may be desirable to study the combustion process in an internal combustion engine that operates over a speed range of approximately 420 r.p.m. to 6000 r.p.m. (3½ c.p.s. to 50 c.p.s.). In the event a measurement is to be made, a suitable transducer is employed to sense the function to be measured and to produce an electrical signal similar thereto. Normally, the output of such a transducer contains very little energy and must be amplified before it can be accurately measured. Although it is possible to amplify signals in this frequency range, the required equipment has a marked tendency to "drift" during the operation thereof due to the various components accumulating charges and/or changing their characteristics. In addition, the characteristics of the transducer may change during the use thereof by a magnitude which is very large compared to the output thereof. As a result, it is frequently difficult to obtain an accurate reference from which the amplified signal may be measured. Consequently, heretofore, such systems have frequently caused erroneous and/or misleading measurements. Although numerous means have been proposed for clamping the systems, they have not been entirely satisfactory.

It is now proposed to provide means for "clamping" the electronic portions of a measuring system to provide an accurate reference from which the signal may be measured. It has been found that when measuring temperatures, pressures, etc., they are determined in relation to the ambient temperature, pressure, etc. and during at least some portion of the cycle, the function will be equal to some known amount. Accordingly, the measuring system will be "clamped" against drifting by maintaining the input signal level such that the output signal level will insure the known portion of the cycle being equal to the known value. More particularly, this is to be accomplished by providing the measuring system with a conventional cathode ray oscilloscope that will continuously produce a luminous oscillogram of the instantaneous values of the amplified signal which is to be measured. A photosensitive element is provided on the face of the oscilloscope for sensing the position of the cathode ray during the limited portion of the cycle when the instantaneous value will be some predetermined amount. This will serve as a suitable reference point and enable the photosensitive element to produce one output whenever the cathode ray is deflected above the reference point and another output whenever the cathode ray is deflected below the reference point. These outputs will be effective to actuate a servo system that will vary the D.C. level of the transducer signal until the entire measuring system will be adjusted to cause the amplified signal to have the known value at the particular reference point chosen. As a result, the measuring system will have a fixed and known reference level from which the signal may be measured.

In the drawings:

Figure 1 is a block diagram of electronic measuring means employing a clamping system embodying the present invention.

Figure 2 is an end view on an enlarged scale of a photosensitive element employed in the clamping system of Figure 1.

Figure 3 is a transverse cross-sectional view of the photosensitive element taken substantially along the plane of line 3—3 in Figure 2.

Figure 4 is a view of the photosensitive element in its operative position on the screen of the oscilloscope of Figure 1.

Referring to the drawings in more detail, the present invention is particularly adapted for use in a measuring system 10 for use in observing a cycle or periodic function 12 having a low frequency or a long period. For example, the function 12 may be the temperature, pressure, etc. inside an internal combustion engine operating over a speed range of approximately 420 r.p.m. to 6000 r.p.m. (3½ c.p.s. to 50 c.p.s.). More particularly the present invention has been found very useful in a system 10 such as disclosed and claimed in copending application S.N. 764,964, filed October 2, 1958, for measuring the temperature of the gases in an internal combustion engine. In such a system the transducer 14 for sensing the variations of the function 12 is an element such as a lead sulfide cell. This cell senses the radiations from the gases and produces an output signal similar thereto. This signal will normally be an amplitude on the order of up to ten millivolts. It is thus necessary to amplify the amplitude of the signal to a more useful level before it can be accurately measured. Accordingly, the transducer 14 is coupled to the input 16 of an amplifier 18 by means of a variable bias network 20. Since the frequency range will be as low as a few cycles per second, the amplifier must be a direct coupled D.C. amplifier 18.

The output 22 of the amplifier 18 is, in turn, interconnected with suitable measuring and/or indicating means 24 for providing the operator with the desired information as to the characteristics of the function 12 that is being investigated.

Transducers 14 and D.C. amplifiers 18 that are normally required for investigations of this nature are frequently subject to considerable "drifting." For example, in the course of a single test operation, the characteristics of a lead sulfide cell may change sufficiently to cause the D.C. level of the output signal to vary over a range that is even greater than the maximum amplitude of the A.C. signal. It is, therefore, apparent that, unless suitable means are provided for electronically "clamping" the system 10, the resultant observations will be erroneous and misleading.

Accordingly, the output of the D.C. amplifier 18 is also interconnected with a cathode ray oscilloscope 26. The vertical deflection plates of the oscilloscope 26 are charged in accordance with the output signal from the D.C. amplifier 18. At the same time the horizontal sweep of the cathode ray is a time function and is coordinated with the cycles of the function 12, i.e., the period of the horizontal sweep will coincide in time and phase with the cycles of the function. Accordingly, the oscilloscope will provide a visual display corresponding to the variations occurring in the function, for example, the temperatures of the gases in the engine cylinder. Normally, during at least some limited fragment of the cycle, the instantaneous value of the function 12 will be some fixed amount. For example, during a limited portion of the engine cycles such as the charging phase, the gas temperature will be substantially atmospheric. Accordingly, the portion of the oscillogram 30 corresponding to this limited portion or reference portion should have a known position.

In order to sense the position of the oscillogram 30 at the reference portion of the curve a differential light detector 32 is secured to the outside of the face of the oscilloscope. In the present instance the light detector 32 comprises a photocell assembly that is divided into an upper light sensitive portion 34 and a lower light sensitive portion 36. These two portions 34 and 36 are disposed upon a backing member 33 of a conductive material and are separated from each other by means of a very narrow band 38 that is inactive or not responsive to light. Thus the two portions 34 and 36 will be isolated from each other. The band 38 or the spacing between the portions 34, 36 is wide enough to exceed the width of a trace on the screen of the oscilloscope 26. This width may be on the order of $\frac{1}{16}$ inch. The photocell is secured onto the face of the cathode ray tube on the outside thereof so that the inactive band 38 will be located at the position where the oscillogram 30 will have a fixed position. That is, the photocell assembly or the light detector 32 is placed on the face of the oscilloscope 26 so that the band 38 coincides with the desired position of the reference portion of the oscillogram 30. If the desired position is in the center of the scope face, the band 38 may coincide with a diameter of the face of the oscilloscope. Thus, in the event the oscillogram 30 is too high at this point, it will illuminate the upper section 34 which will produce a positive voltage between the member 33 and a conductor 40. Conversely, in the event the oscillogram 30 is too low at this point, it will illuminate the lower section 36 and produce a positive voltage between the member 33 and a conductor 42. Each section of the photocell is connected to the inputs to a servo amplifier 44 by conductors 40 and 42. This amplifier 44 is effective to control a servo motor 46. The servo amplifier 44 is responsive to the polarity of the voltage existing between the conductors 40 and 42 as determined by the two sections 34 and 36 of the photocell. Thus, in the event one or the other section is illuminated, the amplifier 44 will actuate the servo motor 46 in a direction corresponding to the section of the photocell which is illuminated.

The servo motor 46 is operatively interconnected with the center tap 48 of a potentiometer 50 in the biasing network 20. This network includes a battery 52 and a pair of dropping resistors 54 and 56 that are arranged to add a D.C. component to the output signal from the transducer 14. It may thus be seen that when the transducer 14 senses the variations in the function 12 and supplies an electrical signal to the input of the D.C. amplifier 18, the oscilloscope 26 will produce an oscillogram 30 representing the function 12. In the event the oscillogram 30 passes through the inactive portion 38 of the photocell, there will be no output therefrom and the servo motor 46 will not be energized. However, in the event the oscillogram 30 is above or below the inactive zone, one or the other of the photo sections 34 and 36 will be illuminated. This will produce a corresponding output signal from the photocell which will be amplified by the servo amplifier 44. This will, in turn, energize the servo motor 46 and move the potentiometer center tap 48 to vary the level of the D.C. component in the transducer output. The direction of the movement will cause the reference portion of the oscillogram 30 to return to the fixed point. The D.C. level of the output from the transducer 14 will be some predetermined amount and an accurate measurement can be made of the signal in terms of a known reference level.

Thus it is seen that the above described drift compensator is effective to maintain a reference portion of the output of the amplifier 18 at a predetermined level. This is done by maintaining the portion of the oscillogram 30 which corresponds to this reference portion at a predetermined physical position on the face of the scope. The predetermined level is the amplitude of the output signal of the amplifier 18 during the reference portion of the cyclic output. This level may be zero or some positive or negative value.

It is to be understood that, although the invention has been described with specific reference to a particular embodiment thereof, it is not to be so limited since changes and alterations therein may be made which are within the full intended scope of this invention as defined by the appended claims.

What is claimed is:

1. In a device for amplifying a periodic signal having a reference portion in the cycle thereof, the combination of amplifier means, and means responsive to a limited portion of the output signal from said amplifier means corresponding to said reference portion and effective to vary the input to said amplifier means to maintain said limited portion of said output signal at a predetermined level.

2. In a device for amplifying a periodic signal having a reference portion in the cycle thereof, the combination of an amplifier having an input for receiving said periodic signal and an output for discharging an amplified periodic signal, means operatively interconnected with said output and responsive to the instantaneous value of said amplified signal during only a limited portion of the cycle thereof, said means being effective to vary the level of said periodic input signal to maintain said portion of said amplified signal constant.

3. In a device for amplifying a periodic signal having a reference portion in the cycle thereof, the combination of an amplifier, a variable bias input to said amplifier for receiving said periodic signal, an output from said amplifier, means operatively interconnected with said variable bias input and said output, said means being responsive to the instantaneous value of the amplified signal from said output during only a limited portion of the cycle corresponding to said reference portion, and effective to vary the bias of said input to maintain said instantaneous value equal to a predetermined amount.

4. In a measuring system the combination of a transducer for sensing a periodic function having a reference portion in the cycle thereof and producing a signal representative thereof, an amplifier operatively interconnected with said transducer and effective to amplify said signal, means operatively interconnected with the output from said amplifier and responsive to said amplified signal during said reference portion of said cycle, said means being operatively interconnected with the input to said amplifier for varying the level of said input signal to maintain the portion of said output signal corresponding to said reference portion equal to some predetermined amount.

5. In a measuring system the combination of a transducer for sensing a periodic function having a reference portion in the cycle thereof and producing a signal representative thereof, an amplifier effective to amplify said signal, a coupling network interconnecting said transducer with the input to said amplifier and effective to vary the D.C. level of said signal, means operatively interconnected with the output to said amplifier for sensing the instantaneous amplitude of said amplified signal during said reference portion of said cycle, said means being operatively interconnected with said network and effective to vary said D.C. level to maintain said instantaneous amplitude constant.

6. In a measuring system the combination of a transducer for sensing a periodic function having a reference portion in the cycle thereof and producing an electrical signal representative thereof, an amplifier, coupling means interconnecting said transducer with the input to said amplifier for supplying said signal thereto, an oscilloscope interconnected with the output of said amplifier for producing a visible display of the amplified signal, means responsive to the position of a limited portion of said display corresponding to said reference portion and operatively interconnected with said coupling for varying the D.C. level of said signal to maintain said limited portion of said display at a predetermined position such that the portion of said amplified signal corresponding to said reference portion will remain at a predetermined level.

7. In a measuring system the combination of a transducer for sensing a periodic function having a reference portion in the cycle thereof and producing an electrical signal representative thereof, an amplifier, coupling means interconnecting said transducer with the input to said amplifier for supplying said signal thereto, an oscilloscope interconnected with the output of said amplifier for producing a visible display of the amplified signal, a photosensitive cell on said oscilloscope for sensing the instantaneous position of a limited portion of said visible display corresponding to said reference portion, means operatively interconnected with said coupling means and said cell for varying said coupling to maintain said position constant such that the portion of said amplified signal corresponding to said reference portion will remain at a predetermined level.

8. In a measuring system the combination of a transducer for sensing a periodic function having a reference portion in the cycle thereof and producing an electrical signal representative thereof, an amplifier, coupling means interconnecting said transducer with the input to said amplifier for supplying said signal thereto, an oscilloscope interconnected with the output of said amplifier for producing a visible display of the amplified signal, a photosensitive cell on said oscilloscope for sensing the instantaneous amplitude of a limited portion of said visible display, servo means operatively interconnected with said cell and said coupling to vary the D.C. component in said signal to maintain said amplitude at a predetermined position such that the portion of said amplified signal corresponding to said reference portion will remain at a predetermined level.

9. In a measuring system the combination of a transducer for sensing a periodic function having a reference portion in the cycle thereof and producing an electrical signal representative thereof, an amplifier, coupling means interconnecting said transducer with the input to said amplifier for supplying said signal thereto, an oscilloscope interconnected with the output of said amplifier for producing a visible display of the amplified signal, a differential light detector on said oscilloscope effective to produce an output indicative of the position of a particular portion of said display corresponding to said reference portion relative to a desired position, servo means operatively interconnected with said light detector for adjusting said coupling means to vary the D.C. level of said signal to maintain said particular portion of said display coincident with said desired position and such that the portion of said amplified signal corresponding to said reference portion will remain at a predetermined level.

10. In a measuring system, an amplifier having an input and an output and adapted to amplify a low frequency periodic signal having a reference portion in the cycle thereof, an oscilloscope connected to said output and adapted to produce a trace on the screen thereof having a vertical deflection in accordance with the amplified signal, photoelectric means located on said screen in the area upon which is displayed the portion of said signal corresponding to said reference portion, said photoelectric means adapted to produce an output voltage when the vertical position of said portion deviates from a predetermined position, said output voltage having a polarity dependent upon the direction of deviation, and control means responsive to the polarity of said output voltage and effective to vary the voltage level at said input to said amplifier until the level of said reference portion at said output corresponds to a predetermined level.

References Cited in the file of this patent

UNITED STATES PATENTS

| | | |
|---|---|---|
| 2,664,520 | Wiens | Dec. 29, 1953 |
| 2,734,137 | Patterson | Feb. 7, 1956 |
| 2,734,949 | Berry | Feb. 14, 1956 |
| 2,837,687 | Thompson et al. | June 3, 1958 |
| 2,846,586 | Jernakoff | Aug. 5, 1958 |
| 2,855,539 | Hoover | Oct. 7, 1958 |